Feb. 21, 1933. A. C. ROWLEY 1,898,899
VALVE FOR CARBON DIOXIDE FIRE EXTINGUISHING APPARATUS
Filed June 30, 1932
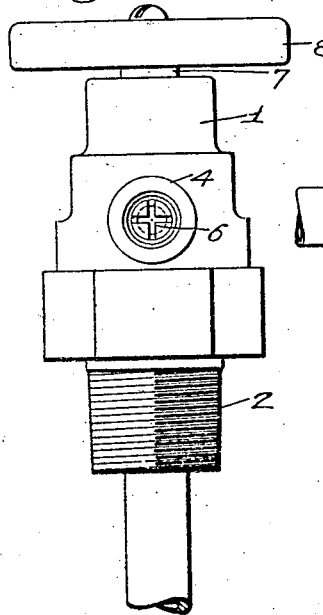
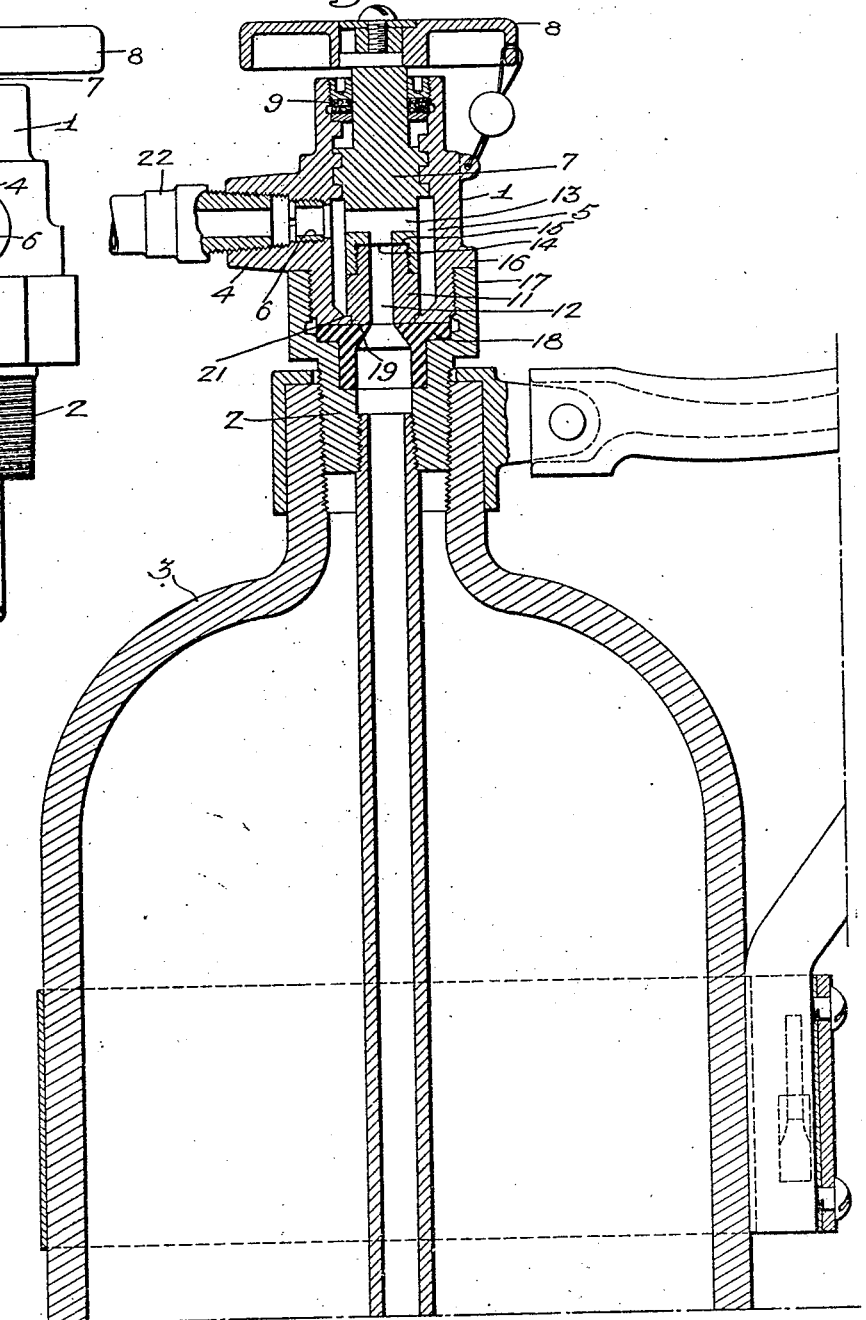
Inventor:
Arthur C. Rowley
by his Attorneys
Howson & Howson Patented Feb. 21, 1933

1,898,899

UNITED STATES PATENT OFFICE

ARTHUR C. ROWLEY, OF DREXEL HILL, PENNSYLVANIA, ASSIGNOR TO GLOBE AUTOMATIC SPRINKLER COMPANY, OF PHILADELPHIA, PENNSYLVANIA, A CORPORATION OF PENNSYLVANIA

VALVE FOR CARBON DIOXIDE FIRE EXTINGUISHING APPARATUS

Application filed June 30, 1932. Serial No. 620,217.

This invention relates to improvements in carbon dioxide fire-extinguishing systems, and more particularly to improvements in valves of a character adapted for use with containers for the carbon dioxide.

One object of my invention is to provide a valve adapted for the specified use which shall be relatively simple in form and of relatively low manufacturing cost and which shall be highly efficient in operation.

Another object of the invention is to provide a safety means incorporated in the device in a novel and improved manner.

Still another object of the invention is to provide a novel form of valve seat insuring positive sealing of the container when the valve is seated.

The invention further resides in certain novel and advantageous details and structural features hereinafter set forth and illustrated in the attached drawings, in which:

Figure 1 is a side elevational view of a valve made in accordance with my invention, and Fig. 2 is a vertical sectional view through the valve and a portion of a container to which the valve is attached.

With reference to the drawing, the valve comprises a casing 1 having at is lower end a threaded extension 2 through the medium of which and as shown in Fig. 2 the valve casing is secured in the container 3 which holds the carbon dioxide fire-extinguishing medium. At one side the casing has an internally threaded hollow boss 4 providing both a charging and discharge port communicating with the interior chamber 5 of the casing. Threaded into the inner end of the boss 4 is a sleeve 6 which provides a restriction for the aforesaid port.

Threaded into the upper end of the casing 1 is a valve stem 7. this stem projecting beyond the upper end of the casing and having attached thereto a hand wheel 8 by means of which the stem may be turned and thereby advanced or retracted in the casing. Suitable packing means 9 is provided in the upper end of the casing and around the valve stem 7. sealing the joint between the said stem and the casing. The stem 7 has threaded into the inner end thereof a plunger 11, this plunger having a longitudinal passage 12 which communicates with a transverse passage 13 in the lower end of the stem 7, which transverse passage communicates with the chamber 5. Confined between the stem 7 and the plunger 11 and extending across and closing the passage 12 is a frangible disk 14, a gasket 15 preferably being provided to insure a thorough seal at the clamped edges of the disk. The disk 14 which preferably is of phosphor-bronze or other metal inert to carbon dioxide is adapted to rupture under a predetermined excessive pressure within the container 3.

As illustrated in Fig. 2, the casing 1 comprises upper and lower sections 16 and 17 respectively, the upper section being threaded into the lower section and confining within the latter a valve seat element 18 of flexible rubber, this element having a tapered portion 19 projecting inwardly beyond the abutting lower edge surface of the upper section 16 of the valve casing. The inwardly projecting portion 19 of the element 18 constitutes a seat for the lower end of the plunger 11, as shown in Fig. 2, and the lower end of the plunger 11 is undercut on its outer surface to provide a shoulder 21 which by engaging a reverse shoulder at the bottom of the upper casing section 16 limits the downward movement of the plunger 11 and the stem 7, while at the same time insuring a firm contact between the lower end of the plunger and the valve seat element 18.

In charging the container 3 the stem 7 is backed away through the medium of the hand wheel 8 to elevate the plunger 11 from the element 18 upon which it normally seats, and a charging connection 22 is threaded into the outer end of the boss 4. Through this connection the $CO_2$ is admitted under pressure to the container 3, and when the latter has been fully charged, the stem 7 is again turned down to bring the plunger 11 into engagement with the seat element 18, the pressure of the $CO_2$ within the container acting upon the flexible rubber seat element to create an effective seal between this element and the plunger preventing escape of the $CO_2$ therebetween The charging connection 22 is then removed. Release of the $CO_2$ and discharge thereof through the hollow boss 4 as a discharge port may now be effected when required by elevating the plunger 11 from its seat by manipulation of the hand wheel 8. In the event that abnormal pressures are developed within the container 3 while the valve is in the closing position illustrated in Fig. 2, this pressure when reaching a predetermined magnitude will rupture the disk 14, permitting discharge of the contents of the container through the passages 12 and 13, and from the chamber 5 through the boss 4.

A material simplification is effected through the use of the flexible valve element 18, which as described operates through the medium of the internal pressure in the casing to insure a thorough sealing of the container, and by incorporation of the relief device in the form of the frangible disk 14 in the movable valve element.

It will be apparent, however, that there may be modifications in the detail structure of the device without departure from the invention.

I claim:

1. In a valve of the stated character, the combination with a casing having a chamber, and independent ports communicating with said chamber, a flexible rubber valve seat element secured in one of said ports, an adjustable valve element in the casing adapted to engage said flexible seat element to seal the associated port, a passage in said valve element constituting a bypass between said ports, and a pressure-release device normally closing said bypass.

2. In a valve of the stated character, the combination with a casing having a chamber, independent ports communicating with said chamber, an annular valve seat element secured in one of said ports, said element being flexible, a valve element adjustable in the casing and adapted to engage said seat element to close the associated port, interengaging means upon said valve element and the casing for limiting the movement of the element in the direction of the seat, a passage in said valve element constituting a bypass between the ports, and pressure-relief means normally closing said bypass.

3. In a valve of the stated character, the combination with a casing having independent ports communicating with a common chamber, said casing comprising separable sections, a flexible rubber valve seat element confined between said sections and embracing one of said ports, a valve element adjustably mounted in said chamber and cooperative with said seat element to close the associated port, and means for limiting the movement of said valve element in the direction of said seat to thereby prevent undue flexure of said flexible seat element under pressure of said valve element.

ARTHUR C. ROWLEY.